(12) United States Patent
Tan et al.

(10) Patent No.: US 12,502,397 B2
(45) Date of Patent: Dec. 23, 2025

(54) PARENTERAL NUTRITION FORMULATION AND METHODS OF PREPARATION THEREOF

(71) Applicant: Stellar Biomolecular Research GmbH, Edenkoben (DE)

(72) Inventors: Kor Seng @ Chan Kok Seng Tan, Edenkoben (DE); Bi Fah Wong, Edenkoben (DE); Joanamarie R Kuyong, Edenkoben (DE)

(73) Assignee: STELLAR BIOMOLECULAR RESEARCH GMBH, Edenkoben (DE)

( * ) Notice: Subject to any disclaimer, the term of this patent is extended or adjusted under 35 U.S.C. 154(b) by 456 days.

(21) Appl. No.: 18/030,129

(22) PCT Filed: Dec. 31, 2020

(86) PCT No.: PCT/IB2020/001100
§ 371 (c)(1),
(2) Date: Apr. 4, 2023

(87) PCT Pub. No.: WO2022/096913
PCT Pub. Date: May 12, 2022

(65) Prior Publication Data
US 2023/0364116 A1    Nov. 16, 2023

(30) Foreign Application Priority Data
Nov. 6, 2020 (MY) .............................. PI2020005841

(51) Int. Cl.
| | | |
|---|---|---|
| *A61K 31/685* | (2006.01) |
| *A61K 9/00* | (2006.01) |
| *A61K 31/355* | (2006.01) |
| *A61K 31/455* | (2006.01) |
| *A61K 31/575* | (2006.01) |
| *A61K 31/7068* | (2006.01) |
| *A61K 31/7076* | (2006.01) |

(52) U.S. Cl.
CPC .......... *A61K 31/685* (2013.01); *A61K 9/0029* (2013.01); *A61K 31/355* (2013.01); *A61K 31/455* (2013.01); *A61K 31/575* (2013.01); *A61K 31/7068* (2013.01); *A61K 31/7076* (2013.01)

(58) Field of Classification Search
None
See application file for complete search history.

(56) References Cited

U.S. PATENT DOCUMENTS 10,624,902 B1    4/2020    Morrissette

FOREIGN PATENT DOCUMENTS

| CN | 101940586 A | 1/2011 |
| WO | WO2018226732 A8 | 1/2019 |
| WO | WO2019232054 A1 | 12/2019 |

OTHER PUBLICATIONS

Gatti et al., *A comparative study of free plasma choline levels following intramuscular administration of L-alpha-glycerylphosphorylcholine and citicoline in normal volunteers.* Int J Clin Pharmacol Ther Toxicol., 1992; vol. 30, No. 9, pp. 331-335.

Weiss G.B., *Metabolism and actions of CDP-choline as an endogenous compound and administered exogenously as citicoline.* Life Sci., 1995; vol. 56, pp. 637-660.

*Primary Examiner* — Patrick T Lewis
(74) *Attorney, Agent, or Firm* — MUNCY, GEISSLER, OLDS & LOWE, P.C.

(57) ABSTRACT

An aqueous parenteral nutrition composition includes deoxycholic acid, cytidine diphosphate-choline and choline alfoscerate. The parenteral nutrition further includes 4.5-5.5% (w/v) phosphatidylcholine, in which combination of the phosphatidycholine with cytidine diphosphate-choline and choline alfoscerate increases choline bioavailability for immediate onset of action.

10 Claims, 1 Drawing Sheet

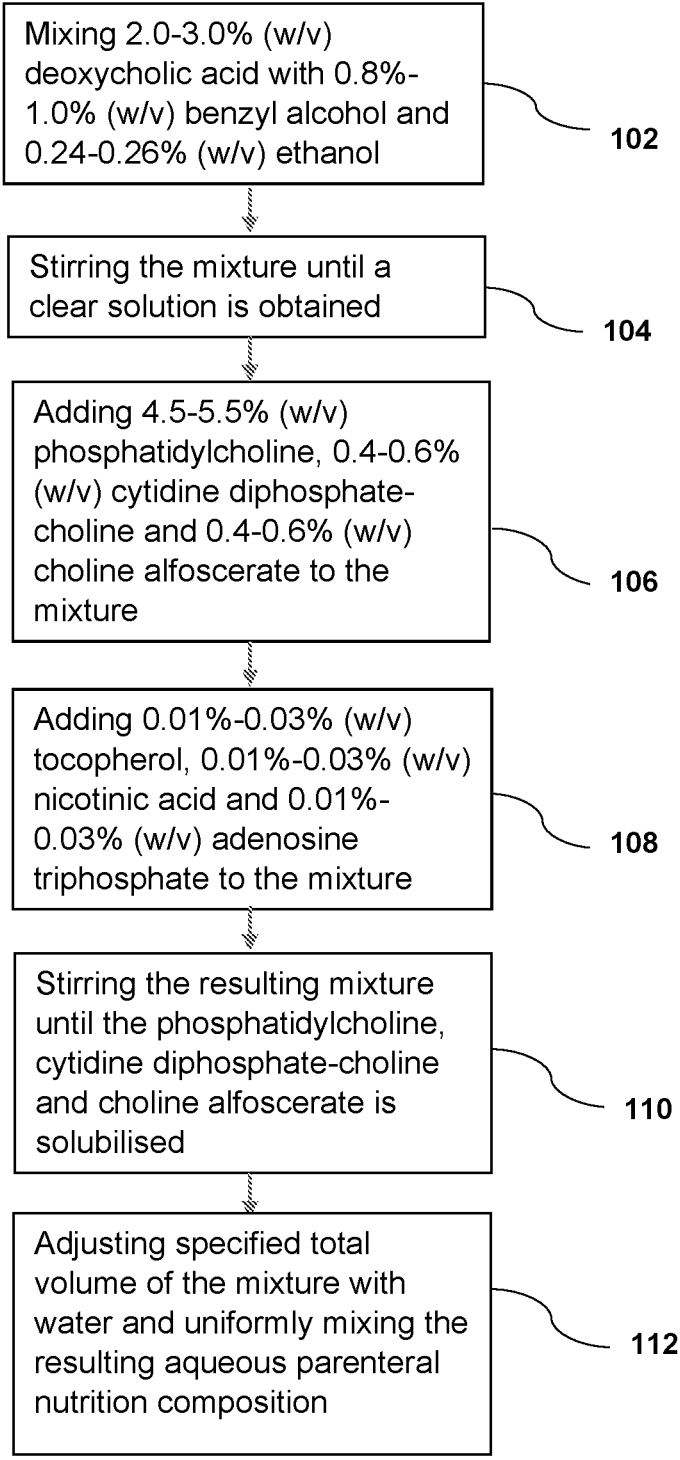

PARENTERAL NUTRITION FORMULATION AND METHODS OF PREPARATION THEREOF

FIELD OF INVENTION

The present invention generally relates to a parenteral nutrition formulation and the methods of preparation thereof. In particular, the present invention describes a parenteral nutrition formulation for the management of cardiovascular diseases, non-alcoholic fatty liver and cognitive functions together with the methods of preparation thereof.

BACKGROUND ART

Parenteral nutrition (PN) formulation is essential for patients who cannot eat or absorb enough food through tube feeding formula or by mouth to maintain good nutrition status. Patients may need PN for any types of diseases or conditions that impair food intake, nutrient digestion or absorption. Some diseases and conditions where PN is indicated include but are not limited to short bowel syndrome, GI fistulas, bowel obstruction, critically ill patients, and severe acute pancreatitis.

Choline is a nutrient obtained through both dietary intake and endogenous synthesis. Our body needs choline to synthesize phosphatidylcholine and sphingomyelin, two major phospholipids vital for cell membranes. Phosphatidylcholine (PC) is a molecule that contains two fatty acids attached to a glycerol backbone with a phosphate group and choline. All plant and animal cells need choline to preserve their structural integrity. In addition, choline is needed to produce acetylcholine, an important neurotransmitter for memory, mood, muscle control and other brain and nervous system functions.

Intestinal bacteria that live in the digestive tract efficiently compete with host for dietary choline, hence depending on the number of intestinal bacteria, a portion of dietary choline is degraded by intestinal bacteria to dimethylamines and trimethylamines before absorbed in the small intestine. This process significantly lowers choline bioavailability, and elevated levels of trimethylamine in the body are associated with the development of trimethylaminuria. Trimethylamin is also metabolized by the liver to trimethylamine N-oxide which is being investigated as a possible proatherogenic substance which may accelerate atherosclerosis. Trimethylamine N-oxide has been implicated in metabolic, cardiovascular and cerebrovascular diseases.

The present invention suggests a nutrition formulation which is to be administered parenterally into the human body and therefore avoiding the problems which arises from choline metabolism by intestinal bacteria. Further, the parenteral nutrition formulation provides for more availability of choline for an immediate onset of action in supporting the brain function, and for the management of cardiovascular and liver diseases.

SUMMARY OF INVENTION

One embodiment of the present invention provides an aqueous parenteral nutrition composition, comprising deoxycholic acid, cytidine diphosphate-choline and choline alfoscerate, characterized in that, the parenteral nutrition further comprises 4.5-5.5% (w/v) phosphatidylcholine, in which combination of the phosphatidycholine with cytidine diphosphate-choline and choline alfoscerate increases choline bioavailability for immediate onset of action.

Preferably, the composition further comprises of 0.01-0.03% (w/v) tocopherol, 0.01%-0.03% (w/v) nicotinic acid, and 0.01%-0.03% (w/v) adenosine triphosphate.

Preferably, the concentration of deoxycholic acid is 2.0-4.0% (w/v).

Preferably, the concentration of cytidine diphosphate-choline is 0.4-0.6% (w/v).

Preferably, the concentration of choline alfoscerate is 0.4-0.6% (w/v).

Preferably, the combination of phosphatidycholine with cytidine diphosphate-choline and choline alfoscerate administered parenterally lowers homocysteine level in the blood.

One embodiment of the present invention provides a method for preparing an aqueous parenteral nutrition composition, comprising steps of mixing 2.0%-4.0% (w/v) deoxycholic acid with benzyl alcohol and ethanol, stirring the mixture until a clear solution is obtained, adding 4.5-5.5% (w/v) phosphatidylcholine, cytidine diphosphate-choline and choline alfoscerate to the mixture, stirring the resulting mixture until the phosphatidylcholine, cytidine diphosphate-choline and choline alfoscerate is solubilised, and adjusting specified total volume of the mixture with water and uniformly mixing the resulting aqueous parenteral nutrition composition, characterized in that, the combination of phosphatidycholine with cytidine diphosphate-choline and choline alfoscerate in the resulting aqueous parenteral nutrition composition increases choline bioavailability for immediate onset of action.

Preferably, the method further comprises adding 0.01-0.03% (w/v) tocopherol, 0.01%-0.03% (w/v) nicotinic acid and 0.01%-0.03% (w/v) adenosine triphosphate.

Preferably, the concentration of cytidine diphosphate-choline is 0.4-0.6% (w/v).

Preferably, the concentration of choline alfoscerate is 0.4-0.6% (w/v).

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

BRIEF DESCRIPTION OF DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which:

The FIGURE illustrates the method for preparing a parenteral nutrition formulation according to the present invention.

DETAILED DESCRIPTION OF INVENTION

The present invention generally relates to a parenteral nutrition formulation and the methods of preparation thereof. In particular, the present invention describes a parenteral nutrition formulation for the management of cardiovascular diseases, non-alcoholic fatty liver and cognitive functions.

Hereinafter, the parenteral nutrition formulation and the methods of preparation thereof according to the present invention will be described in detail according to the preferred embodiments. It is to be understood that limiting the description to the preferred embodiments of the invention is merely to facilitate discussion of the present invention and it is envisioned without departing from the scope of the appended claims.

The present invention discloses a parenteral nutrition formulation which comprises a combination of three main active ingredients which are choline alfoscerate (Alpha GPC), cytidine diphosphate-choline (CDP Choline), and phosphatidylcholine. The parenteral nutrition formulation, according to a preferred embodiment, comprises one phospholipid, two free choline, bile acid and water, along with few other additional components such as tocopherol, nicotinic acid and adenosine triphosphate to form a stable mixed micelle preparation and to further compliment the formulation efficacy for the management of cardiovascular diseases, non-alcoholic fatty liver and cognitive functions.

Choline is a nutrient obtained through both dietary intake and endogenous synthesis, and it is used for the synthesis of the neurotransmitter acethycholine and also involved in methyl-group metabolism, particularly in the liver, because it is a major dietary source of methyl groups via its irreversible oxidation to betaine and the subsequent synthesis of S-adenosylmethionine.

Orally ingested phosphatidylcholine is absorbed readily from the intestines and transported to the liver for metabolism via the portal vein drainage system. The choline bioavailability from oral supplementation is highly affected by gastrointestinal health status. When choline is infused intravenously, phosphatidylcholine by-passed the intestinal absorption, degradation process and reduce production of trimethylamine in the human body, and delivered to the liver via the hepatic artery, Liver is the major site of choline metabolism, where it is found primarily as phosphatidylcholine, it is important for the maintenance of phosphatidylcholine supply within the liver.

By referring to the choline metabolism chain, choline is initially converted to phosphocholine by choline kinase (CK), using ATP as a phosphate donor. An enzyme called phosphocholine cytidylyltransferase (CCT) uses cytidine triphosphate (CTP) to convert phosphocholine into CDP choline. The conversion of phosphocholine to CDP choline is the slowest step in the choline metabolism chain. CDP choline is included in the formulation of the present invention because it is the choline form produced after the rate-limiting step and has the ability to cross the blood-brain barrier and reach the central nervous system.

CDP choline is more than a choline source; it contains equimolar amounts of choline and cytidine which will help to increase the plasma uridine nucleotides and choline in the body. Nucleotide uridine is a key factor in synaptic strength and neural connectivity. In the present invention, CDP choline serves as a precursor to nucleotide uridine and nootropic ingredients. Uridine, along with CDP choline, promotes the growth of new dopamine receptors in the brain by activating D1 and D2 receptor signaling.

In the last step in the pathway, CDP choline is esterified withy diacylglycerol (DAG) by cholinephosphotransferase (CEPT) to produce phosphatidylcholine. Essential fatty acids such as eicosapentaenoic acid (EPA) and docosahexaenoic acid (DHA) are involved in the creation of DAG. Phosphatidylcholine is the end product of the CDP choline pathway, most choline in the body and brain are in the form of phosphatidylcholine, it serves as a reservoir for choline. Phosphatidylcholine involves in the hepatic transport of VLDL (very low density lipoproteins) and maintenance of the cell membrane integrity that is vital to all the basic biological processes.

Alpha GPC are obtained in the body by the decomposition of phosphatidylcholine. Enzyme reactions in choline pathways is bidirectional, fortification of Alpha GPC in the formulation allow phosphatidylcholine to be used for other purpose instead of broken down into choline. Alpha GPC enter choline pool at different point in choline pathways and have the ability to cross the blood-brain barrier and reach central nervous system. In the present invention, Alpha GPC serves as a potent nootropic ingredient and for sustenance of choline uptake by an aging brain.

Alpha GPC has distinct roles besides the ability to cross blood-brain barrier to directly increase the acetylcholine level within the central nervous system. Alpha GPC also serves as a precursor for biosynthesis of neuronal cell phospholipids, and further augments choline pool to produce betaine which function is to reduce homocysteine level in the blood.

Oral administration of Alpha GPC is hydrolysed in the gut mucosa by the phosphodiesterase and then transported into circulatory system. However, when administered intravenously it is oxidized by glycerophosphorylcholine phosphodiesterase (GPCP) in the brain to produce choline and glycerophosphate. Alpha GPC was show to be metabolized faster after intravenous administration than oral administration, showing different metabolism for the two routes.

The different kinetics and interaction with choline pathways, the fortification of Alpha GPC and CDP Choline in the formulation will allow the upregulation of the CDP Choline pathways and turnover of the phosphatidylcholine cycle; hence offer higher availability of choline for acetylcholine synthesis and other metabolic functions.

Pharmaceutical formulation (parenteral nutrition) of the present invention contains the following:

| | |
|---|---|
| 2000-2500 mg | Phosphatidylcholine |
| 250-350 mg | CDP-Choline |
| 200-300 mg | Alpha-GPC |
| 1000-1500 mg | Deoxycholic Acid |
| 10-15 mg | Tocopherol (Vitamin E) |
| 5-10 mg | Nicotinic Acid (Vitamin B3) |
| 5-10 mg | Adenosine Triphosphate |

Method for preparing an aqueous parenteral nutrition composition, comprising steps of mixing 0.01-0.03% (w/v) deoxycholic acid with benzyl alcohol and ethanol, stirring the mixture until a clear solution is obtained, adding 4.5-5.5% (w/v) phosphatidylcholine, 0.4-0.6% (w/v) cytidine diphosphate-choline and 0.4-0.6% (w/v) choline alfoscerate (Alpha GPC) to the mixture, adding 0.01-0.03% (w/v) tocopherol, 0.01-0.03% (w/v) nicotinic acid and 0.01-0.03% (w/v) adenosine triphosphate to the mixture, stirring the resulting mixture until the phosphatidylcholine, cytidine diphosphate-choline and choline alfoscerate (Alpha GPC) are solubilised, adjusting specified total volume of the mixture with injectable water and uniformly mixing the final resulting aqueous parenteral nutrition composition.

The formulation contains 0.8-1.0% (w/v) benzyl alcohol and 0.24-0.26% (w/v) ethanol as preservative, and sterile injectable water. The final resulting aqueous parenteral nutrition composition is then filtered through a filtration unit to remove bacterial cells, and then the filtered solution is filled into a bottle in an aseptic condition before being sealed.

Enzyme reactions in the choline metabolism chain tend to be bidirectional. Therefore, higher availability of CDP choline and Alpha GPC allow phosphatidylcholine to be utilised for lipid transport, formation of phosphatidylserine, sphingomyelin and support cellular membrane structure and functions rather than breakdown to augment the choline pool.

Supplying choline through administering CDP choline, Alpha GPC and phosphatidylcholine would give an immediate onset of action in supporting the brain function and reduction of homocysteine level in the blood. The choline containing composition is also specifically formulated for lipid metabolism, reduction of free fatty acid build-up at site of stroke induced nerve damage and to dissolve blood clots.

Unless the context requires otherwise or specifically states to the contrary, integers, steps or elements of the invention recited herein as singular integers, steps, or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The invention claimed is:

1. An aqueous parenteral nutrition composition, comprising:
   deoxycholic acid;
   cytidine diphosphate-choline; and
   choline alfoscerate,
   wherein the parenteral nutrition further comprises 4.5-5.5% (w/v) phosphatidylcholine, in which combination of the phosphatidycholine with cytidine diphosphate-choline and choline alfoscerate increases choline bioavailability for immediate onset of action.

2. The aqueous parenteral nutrition composition according to claim 1, wherein the composition further comprises of 0.01-0.03% (w/v) tocopherol, 0.01%-0.03% (w/v) nicotinic acid, and 0.01%-0.03% (w/v) adenosine triphosphate.

3. The aqueous parenteral nutrition composition according to claim 1, wherein the concentration of deoxycholic acid is 2.0-4.0% (w/v).

4. The aqueous parenteral nutrition composition according to in claim 1, wherein the concentration of cytidine diphosphate-choline is 0.4-0.6% (w/v).

5. The aqueous parenteral nutrition composition according to in claim 1, wherein the concentration of choline alfoscerate is 0.4-0.6% (w/v).

6. The aqueous parenteral nutrition composition according to in claim 1, wherein the combination of phosphatidycholine with cytidine diphosphate-choline and choline alfoscerate administered parenterally lowers homocysteine level in the blood.

7. A method for preparing an aqueous parenteral nutrition composition, comprising steps of:
   mixing 2.0%-4.0% (w/v) deoxycholic acid with benzyl alcohol and ethanol;
   stirring the mixture until a clear solution is obtained;
   adding 4.5-5.5% (w/v) phosphatidylcholine, cytidine diphosphate-choline and choline alfoscerate to the mixture;
   stirring the mixture until the phosphatidylcholine, cytidine diphosphate-choline and choline alfoscerate is solubilised; and
   adjusting specified total volume of the mixture with water and uniformly mixing the resulting aqueous parenteral nutrition composition,
   wherein the combination of phosphatidycholine with cytidine diphosphate-choline and choline alfoscerate in the resulting aqueous parenteral nutrition composition increases choline bioavailability for immediate onset of action.

8. The method for preparing an aqueous parenteral nutrition composition according to claim 7, wherein the method further comprises adding 0.01-0.03% (w/v) tocopherol, 0.01%-0.03% (w/v) nicotinic acid and 0.01%-0.03% (w/v) adenosine triphosphate.

9. The method for preparing an aqueous parenteral nutrition composition according to claim 7, wherein the concentration of cytidine diphosphate-choline is 0.4-0.6% (w/v).

10. The method for preparing an aqueous parenteral nutrition composition according to claim 7, wherein the concentration of choline alfoscerate is 0.4-0.6% (w/v).

* * * * *